US005620641A

United States Patent [19]

Berger

[11] Patent Number: 5,620,641

[45] Date of Patent: Apr. 15, 1997

[54] POLYETHYLENE TEREPHTHALATE SHEATH/THERMOPLASTIC POLYMER CORE BICOMPONENT FIBERS, METHOD OF MAKING SAME AND PRODUCTS FORMED THEREFROM

[75] Inventor: Richard M. Berger, Midlothian, Va.

[73] Assignee: American Filtrona Corporation, Richmond, Va.

[21] Appl. No.: 688,215

[22] Filed: Jul. 29, 1996

Related U.S. Application Data

[62] Division of Ser. No. 470,594, Jun. 6, 1995.

[51] Int. Cl.$^{6}$ .................................................... B29D 28/00

[52] U.S. Cl. .................. 264/103; 264/151; 264/DIG. 48

[58] Field of Search .................................... 264/103, 151, 264/DIG. 48

[56] References Cited

U.S. PATENT DOCUMENTS

| | | |
|---|---|---|
| 2,688,380 | 7/1954 | MacHenry . |
| 2,936,482 | 6/1960 | Kilian . |
| 3,095,343 | 6/1963 | Berger . |
| 3,111,702 | 11/1963 | Berger . |
| 3,176,345 | 4/1965 | Powell . |
| 3,192,562 | 7/1965 | Powell . |
| 3,347,247 | 10/1967 | Lloyd . |
| 3,381,070 | 4/1968 | Sublett et al. . |
| 3,409,020 | 11/1968 | Westbrook, Jr. et al. . |
| 3,595,245 | 7/1971 | Buntin et al. . |
| 3,615,995 | 10/1971 | Buntin et al. . |
| 3,637,447 | 1/1972 | Berger et al. . |
| 3,825,379 | 7/1974 | Lohkamp et al. . |
| 3,825,380 | 7/1974 | Harding et al. . |
| 3,849,241 | 11/1974 | Buntin et al. . |
| 3,971,373 | 7/1976 | Braun . |
| 3,972,759 | 8/1976 | Buntin . |
| 4,117,194 | 9/1978 | Barbe et al. . |
| 4,173,504 | 11/1979 | Tomioka et al. . |
| 4,217,321 | 8/1980 | Campbell . |
| 4,270,962 | 6/1981 | Sugihara et al. . |
| 4,286,005 | 8/1981 | Berger . |
| 4,307,151 | 12/1981 | Yamauchi et al. . |

*Primary Examiner*—Christopher Raimund
*Attorney, Agent, or Firm*—Jacobson, Price, Holman & Stern, PLLC

[57] ABSTRACT

Sheath-core bicomponent fibers comprising a core of a low-cost, high strength, thermoplastic material, preferably polypropylene or polybutylene terephthalate, completely covered with a sheath formed of polyethylene terephthalate or a copolymer thereof are produced, preferably melt blown to an average diameter of 12 microns or less, and formed into a self-sustaining, three-dimensional, porous element having various applications, principally as an ink reservoir element for a marking or writing instrument, although the porous element may also find utility as a tobacco smoke filter. Other forms of the product have utility in diverse applications where its excellent capillary, absorption and filtering properties are advantageous. The resultant products retain or improve upon the desirable features and processing capabilities of conventional elements, but are substantially less expensive, requiring less high cost polyester for equivalent or better properties.

17 Claims, 4 Drawing Sheets

POLYETHYLENE TEREPHTHALATE SHEATH/THERMOPLASTIC POLYMER CORE BICOMPONENT FIBERS, METHOD OF MAKING SAME AND PRODUCTS FORMED THEREFROM

This is a divisional of application Ser. No. 08/470,594 filed Jun. 6, 1995, pending.

The instant invention relates to unique polymeric bicomponent fibers and to the production of various products from such fibers by thermal bonding. More specifically, this invention is directed to the production and use of a novel sheath-core melt blown bicomponent fiber wherein a core of a thermoplastic material is substantially fully covered with a sheath of polyethylene terephthalate or a copolymer thereof.

The term "bicomponent" as used herein refers to the use of two polymers of different chemical nature placed in discrete portions of a fiber structure. While other forms of bicomponent fibers are possible, the more common techniques produce either "side-by-side" or "sheath-core" relationships between the two polymers. The instant invention is concerned with production of "sheath-core" bicomponent fibers wherein a sheath of polyethylene terephthalate or a copolymer thereof is spun to completely cover and encompass a core of relatively low cost, low shrinkage, high strength thermoplastic polymeric material such as polypropylene or polybutylene terephthalate, preferably using a "melt blown" fiber process to attenuate the extruded fiber.

The term "polyethylene terephthalate or a copolymer thereof" as used herein refers to a homopolymer of polyethylene terephthalate or a copolymer thereof having a melting point which is higher than the melting point of the thermoplastic core material in the bicomponent fiber.

Conventional linear polyester used to make fibers is the product of reaction of ethylene glycol (1,2 ethanediol) and terephthalic acid (benzene-para-dicarboxylic acid). Each of these molecules has reactive sites at opposite ends. In this way, the larger molecule resulting from an initial reaction can react again in the same manner, resulting in long chains made of repeated units or "mers". The same polymer is also industrially made with ethylene glycol and dimethyl terephthalate (dimethyl benzene-para-dicarboxylate). It is believed that polyesters of a broad range of intrinsic viscosities are useful according to this invention, although those with lower intrinsic viscosities are preferred.

By partially substituting another diol for the ethylene glycol or another diacid for the terephthalic acid, a more irregular "copolymer" is obtained. The same effect is achieved by the substitution of another dimethyl ester for the dimethyl terephthalate. Thus, there is a wide choice of alternative reactants and of levels of substitution.

The deviation from a regularly repeating, linear polymer makes the crystallization more difficult (less rapid) and less complete. This is reflected in a lower and wider melting range. Excessive substitution will result in a totally amorphous polymer which is unacceptable for use in this invention.

Crystar 1946 or 3946 made by DuPont has been successfully used as the sheath-forming material in the production of the bicomponent fibers of this invention and products made therefrom. This copolymer has substituted 17% of the dimethyl terephthalate with dimethyl isophthalate (dimethyl benzyl-meta-dicarboxylate) lowering the peak melting point from 258° C. to 215° C. This melting point is still well above that of polypropylene (166° C).

DuPont's Crystar 3991 with 40% dimethyl isocyanate has a melting point of 160° C, i.e., slightly below the 166° C. melting point of polypropylene. Thus, for bicomponent fibers incorporating a polypropylene core, it is believed that copolymers of polyethylene terephthalate containing up to about 35 weight percent of dimethyl isocyanate or isocyanic acid will be commercially acceptable.

While a comprehensive list of alternate reactants is difficult to identify, other likely substitutes for the diol are propylene glycol, polyethylene glycol and butylene glycol, and other likely substitutes for the diacid are adipic acid and hydroxybenzene acid.

The term "melt blown" as used herein refers to the use of a high pressure gas stream at the exit of a fiber extrusion die to attenuate or thin out the fibers while they are in their molten state. Melt blowing of single polymer component fibers was initiated at the Naval Research Laboratory in 1951. The results of this investigation were published in Industrial Engineering Chemistry 48, 1342 (1956). Seven years later Exxon completed the first large semiworks melt blown unit demonstration. See, for example, Buntin U.S. Pat. Nos. 3,595,245, 3,615,995 and 3,972,759 (the '245, '995 and '759 patents, the subject matters of which are incorporated herein in their entirety by reference) for a comprehensive discussion of the melt-blowing process.

Melt blown polypropylene monocomponent fibers are presently used in the production of a variety of products, including fine particle air and liquid filters, and high absorbing body fluid media (diapers). However, such fibers have low stiffness and very low recovery when compressed. Moreover, they are not susceptible to thermal bonding and are difficult to bond by chemical means. Thus, while they have been successfully used in making thin porous nonwoven webs, they are not commercially acceptable for the production of three-dimensional, self-supporting items such as ink reservoirs, cigarette filters, wicks for chemical and medical test devices, and flat or corrugated filter sheets.

Melt blown monocomponent fibers formed from polyesters such as polyethylene terephthalate have found even less commercial acceptance. Such fibers, which are largely undrawn and not crystallized, rapidly shrink and became extremely brittle upon heating above approximately 70° C. A comprehensive discussion of this problem and a proposal for treatment of melt blown polyester webs with volatile solvents such as acetone to stabilize them, is found in Pruett et al., U.S. Pat. No. 5,010,165 (the '165 patent, the subject matter of which is also incorporated herein in its entirety by reference). The '165 patent provides a good definition of the type of melt blown polyesters which are recognized by the industry as problematic, but the solution proposed in the '165 patent appears environmentally questionable, or, at the very least, quite expensive when safely performed. The instant invention overcomes the lack of stability with the polyesters iterated in the '165 patent in a more commercially and ecologically acceptable manner.

The melt blowing of bicomponent fibers is a recent development and is described for a very specific application in Krueger U.S. Pat. No. 4,795,668 (the '668 patent, the subject matter of which is incorporated herein in its entirety by reference). Also relevant is Berger copending U.S. patent application Ser. No. 08/166,009, filed Dec. 14, 1993 (the subject matter of which is also incorporated herein in its entirety by reference), which describes the use of this process for the production of very fine bicomponent fibers having a sheath of plasticized cellulose acetate, ethylene vinyl acetate copolymer, polyvinyl alcohol, or ethylene vinyl alcohol copolymer, over a core of a thermoplastic material such as polypropylene or the like, primarily for the manufacture of tobacco smoke filter elements.

Notwithstanding the fairly extensive prior art on bicomponent fibers, and even the limited prior art relating to melt blown bicomponent fibers, the sheath-core conjugates of this invention, comprising a sheath of polyethylene terephthalate or a copolymer thereof over a thermoplastic core such as polypropylene or polybutylene terephthalate, are believed to be unique, whether melt blown or not, having attributes that would not have been expected. This dearth of specifically relevant prior art is, however, not surprising since bicomponent fibers have been commonly proposed heretofore primarily for use as thermal bonding materials in the production of non-woven fabrics, for example, in the molding of face masks or the like, as seen in the aforementioned '668 patent, or in the production of filter products, such as cigarette filters or the like, as seen, for example, in Tomioka et al. U.S. Pat. No. 4,173,504 or Sugihara et al. U.S. Pat. No. 4,270,962 (the '504 and '962 patents, respectively, the subject matters of which are incorporated herein in their entirety by reference). Such use requires, however, that a significant circumferential portion of the fiber be formed of a polymer having a lower melting point than the polymer conjugated therewith. Thus, during molding or forming of products from such bicomponent fibers, they may be heated to a temperature between the melting points of the polymers, enabling the lower melting point polymer at the surface to function as the bonding agent without deleteriously affecting the higher melting point polymer material. Obviously, in a sheath-core construction, according to these prior art teachings, the sheath must be formed of the lower melting point polymer or the conjugate will not have useful thermal bonding properties.

In contrast to the prior art bicomponent technology, the disposition of the polymers in the sheath-core bicomponent fibers of this invention comprises a continuous covering of a higher melting point polymer, namely polyethylene terephthalate or a copolymer thereof, over a lower melting point, low shrinkage polymer core such as polypropylene or polybutylene terephthalate. Such fibers, particularly when melt blown, are uniquely adapted to the production of webs or rovings and elements therefrom useful for diverse commercial applications. Yet, it is believed that early attempts to produce and then attenuate melt spun polyester/polypropylene bicomponent fibers were abandoned because of delamination at the fiber interface. The instant inventive techniques enables the production of fine fibers from such diverse polymers by melt blowing the sheath-core bicomponent structures.

A principal focus of the instant invention is the production of elongated highly porous ink reservoir elements for marking and writing instruments. Ink reservoirs have conventionally been formed of a fibrous bundle compacted together into a rod-shaped unit having longitudinal capillary passageways which extend therethrough between the fibers and which serve to hold the ink and release it at the required controlled rate. For a number of years, the fibrous material generally employed for the production of ink reservoirs was plasticized cellulose acetate fibers, which could readily be heat-bonded into a unitary body, and which were compatible with all of the ink formulations then in use.

For example, Bunzl et al. U.S. Pat. No. 3,094,736 (the '736 patent, the subject matter of which is incorporated herein in its entirety by reference), discloses a marking device having as the adsorbent body thereof a tow or tow segment gathered with its filaments randomly oriented primarily in a longitudinal direction and bonded at a plurality of spaced locations by a heat-activated plasticizer for such filaments. An impermeable overwrap was used to give rigidity to the body and facilitate handling thereof.

The term "filamentary tow" is defined in the '736 patent, and such continuous filamentary tows are also discussed in Berger U.S. Pat. Nos. 3,095,343 and 3,111,702 (the '343 and '702 patents, respectively, the subject matters of which are also incorporated herein in their entirety by reference). Such filamentary tows usually comprise at least 50% cellulose acetate fibers. Such tow bodies, bound with plasticizers, provide rigidity. The '702 patent shows an apparatus for handling and steam-treating the tow material to form therefrom a continuous body of fibers randomly oriented primarily in a longitudinal direction. The phrase, "randomly oriented primarily in a longitudinal direction" is intended to describe the condition of a body of fibers which are, as a whole, longitudinally aligned and which are, in the aggregate, in a parallel orientation, but which have short portions running more or less at random in non-parallel diverging and converging directions. The '702 patent teaches bonding, tensioning and impregnating a raw tow into a plasticizer-impregnated layer of continuous uncrimped filaments, and then curing the continuous filamentary tow simultaneously with, or immediately after, gathering of such impregnated layer into a final raw shape. Apparatus is shown for handling such raw tow. The raw tow is taken from a supply bale through a device having jets to separate the tow, and a plasticizing device adds plasticizer to the fibers. The fibers are simultaneously gathered together and heated, thereby comprising a curing station. Some of the apparatus used for processing the cellulose acetate tow in these prior Berger patents are useful with, perhaps, minor modifications, to process the melt blown bicomponent fiber webs of the instant invention, as will be discussed in some detail hereinbelow.

Over the years, ink formulations have been developed that are not compatible with, and tend to degrade, cellulose acetate. Thus, various thermoplastic fibers, in particular, fine denier polyester fibers, such as polyethylene terephthalate, replaced cellulose acetate as the polymer of choice in the production of ink reservoir elements for disposable writing and marking instruments. Unfortunately, such polyester fibers are practically impossible to thermally bond due to the highly crystalline nature of conventional polyethylene terephthalate fibers. Resin bonding is slow and expensive and greatly reduces ink absorption. Undrawn polyethylene terephthalate fibers are not crystallized and can be thermally bonded, but such amorphous polymers shrink excessively in normal use and become brittle.

Therefore, techniques for forming unitary ink reservoirs from such materials have generally required the incorporation of extraneous adhesives and/or have overwrapped the porous rod with a covering or coating of plastic film to render the same relatively self-sustaining. Polyester polymers are also relatively expensive. The requirement for additional materials or processing techniques to commercially produce ink reservoir elements from such materials exacerbated the high manufacturing costs.

Efforts to heat-bond polyester fibers to each other in the absence of additive adhesives have not met with much success. Because of the narrow softening point of crystalline polyester polymers, it has not been feasible to commercially bond drawn polyester fibers such as tow with heat. As noted, undrawn or amorphous polyester fibers are heat-bondable, but produce an unusable product which shrinks excessively during processing. Moreover, such materials lack stability in the presence of commercial inks at the temperatures required for storage of writing instruments.

Consequently, for some time, polyester fiber ink reservoir elements were commercially produced in the form of an unbonded bundle of fibers compacted and held together in a rod-shaped unit by means of a film overwrap. Depending upon the design of the writing instrument in which such reservoirs were incorporated, they could be provided with a small diameter plastic "breather" tube disposed between the fibrous bundle and the overwrap to serve as an air release passage, if necessary.

Such film-overwrapped polyester fiber ink reservoir elements, when made with parallel continuous-filament fibers, have had adequate ink holding capacity and ink release properties for use with certain types of marking or writing instruments, primarily those employing fiber tips or nibs. Yet, with the more recent development of roller ball writing instruments which require a faster ink release, or "wetter" system, such ink reservoir elements are commercially unacceptable. Attempts to increase the rate of ink release by lowering the fiber density and/or changing the fiber size had limited success because 1) the release was not uniform from start to finish; 2) the reduced fiber density decreased the ink holding capacity of the reservoir; 3) the low density polyester tow formed a very soft "rod" which was difficult to handle in the high speed automated commercial production equipment; and (4) the ink was often held so loosely that when writing instruments incorporating such reservoirs were dropped, "leakers" occurred. To test for "leakers" a pen or the like is dropped point first onto a hard surface. Should ink leak or spurt out, the product is unacceptable.

To overcome such "leakers" polyester sliver having random fibers has been used which holds the ink better at lower densities. However, sliver-type polyester ink reservoir elements still tend toward undesirable softness and often suffer from unacceptable weight variation which makes it difficult to control ink flow to a roller marker.

Forming the reservoir from staple fibers randomly laid, rather than from continuous-filament parallel fibers, has been found to increase the ink release properties of short-length reservoirs, but at the longer lengths required for adequate ink holding capacity, this construction lacks the capillarity to function effectively.

Some of these prior art problems were overcome by the techniques disclosed in Berger U.S. Pat. No. 4,286,005 (the '005 patent, the subject matter of which is incorporated herein in its entirety by reference). The ink reservoir of the '005 patent provides a combination of ink holding capacity and ink release properties useful with various types of marking or writing instruments, including roller markers and plastic nibs. Such ink reservoirs are formed from coherent sheets of flexible thermoplastic fibrous material composed of an interconnecting network of randomly arranged, highly dispersed, continuous-filament junctions which has been embossed with a multiplicity of longitudinally extending parallel grooves and formed or compacted into a dimensionally stable rod-shaped body whose longitudinal axis extends parallel to the embossed grooves. This ink reservoir could be provided with a longitudinal slot extending continuously along the periphery of the entire length of its body if a "breather" passage was required for the particular barrel design. Unfortunately, the ink reservoir of the '005 patent, while overcoming many problems with prior art products, required the use of relatively expensive materials, having a complex shape, and, for this reason, has not found commercial acceptance.

Most commercially available polyester ink reservoirs are currently made by the process described in Berger U.S. Pat. No. 4,729,808 (the '808 patent, the subject matter of which is incorporated herein in its entirety by reference) which utilizes a raw material stretch yarn, often referred to as "false twist stretch yarn", which has unusual properties including the ability to stretch and curl or twist. For the most part, the product and process of the '808 patent overcame substantially all of the aforementioned problems of the prior art and, thus, has achieved remarkable acceptance in the marking and writing instrument market. However, false twist yarn requires the use of melt spun fibers, generally averaging over 2 denier per filament (dpf) or about 12 microns in diameter. While larger fibers are useful in some wetter systems, since larger fibers take up more volume, there is less interstitial space for holding ink and, thus, less capacity in the reservoir. Small fiber size, less than about 12 microns, which cannot be achieved with false twist yarn, provides better release pressure without reducing capacity. Higher release pressure, which minimizes leakers, a particular problem with some very low surface tension ink compositions, is difficult to realize with false twist yarn. Increasing density to improve leakers, further reduces capacity.

As noted, polyesters such as polyethylene terephthalate, which are uniquely effective in the production of ink reservoir elements because of their compatibility with ink formulations currently in use, are expensive compared to other polymer materials. Therefore, the ability to minimize the quantity of polyethylene terephthalate necessary to the production of an ink reservoir having acceptable ink holding capacity, while being capable of controllably releasing the ink in a marking or writing instrument, would be highly desirable. The use of a bicomponent fiber which replaces a significant portion of the polyethylene terephthalate with a lower cost polymer is problematic because polyethylene terephthalate has a higher melting point that the common thermoplastic polymers with which it might be conjugated, such as polypropylene or polybutylene terephthalate. Thus, it would be expected that a sheath-core bicomponent fiber wherein the sheath was effectively entirely polyethylene terephthalate as is necessary for compatibility with the ink, would not be sufficiently bondable to produce a substantially self-sustaining porous rod for commercial application as an ink reservoir. Moreover, attenuation of such materials by conventional drawing or stretching techniques to produce fine bicomponent fibers capable of forming a high capacity porous rod is limited by the difference in processing properties of the conjugated polymers resulting in delamination or separation of the core from the sheath during stretching. These and other anticipated problems have discouraged the use of bicomponent fiber forming technology heretofore in the production of ink reservoir elements for marking and writing instruments. Surprisingly, the instant invention has found that, with careful selection of the processing techniques and materials, a bicomponent fiber having a complete polyethylene terephthalate sheath can be commercially processed to produce a highly efficient, low cost, ink reservoir element.

While the primary application of the instant inventive concepts are in the production of ink reservoir elements for use in marking and writing instruments, the bicomponent fibers of this invention can be effectively used in the production of many other commercially important products. For example, sheets formed from such fibers have excellent filtration properties making them particularly useful in high temperature filtration environments because of the relatively high melting point of polyethylene terephthalate. Moreover, the same porous rod which can be used as an ink reservoir element comprises a network of continuous fibers which defines tortuous interstitial paths effective for capturing fine particulate matter when a gas or liquid is passed therethrough as in a filtering application. Filter rods made from such materials are substantially self-sustaining, provide commercially acceptable hardness, pressure drop, resistance to draw, and filtration characteristics when used, for example, as tobacco smoke filter elements in the production of filtered cigarettes or the like. While the taste properties of the polyethylene terephthalate polymer sheath in the bicomponent fibers of such a filter element may not be acceptable to many smokers, it is believed possible to add a smoke-modifying or taste-modifying material to the surface of the fiber or even to compound a material such as tobacco extract, or even menthol, into the sheath-forming polymer to overcome this problem. Moreover, the introduction of an additive, such as particles of activated charcoal which enhances the gas phase filtration efficiency of a tobacco smoke filter element, into the highly turbulent environment produced at the exit of the sheath-core bicomponent extrusion die by the high pressure gas streams used in the melt blowing attenuation techniques of this invention, results in surprisingly uniform incorporation and bonding of the additive into the web or roving and, ultimately, the filter rod, produced therefrom.

Thus, bicomponent fibers according to this invention have significant commercial applications in the production of wick reservoirs, that is, materials designed to take up a liquid and later controllably release the same as in an ink reservoir for a marking and writing instrument. They are also particularly useful in the production of filters, whether in sheet or rod form.

Additionally, because of their high capillarity, such materials function effectively in the production of simple wicks for transporting liquid from one place to another. The wicking properties of these materials may find use, for example, in the production of the fibrous nibs found in certain marking and writing instruments. Wicks of this nature are also useful in diverse medical applications, for example, to transport a bodily fluid by capillary action to a test site in a diagnostic device.

Products made from the bicomponent fibers of the instant invention are not only useful as wicks and wick reservoirs, they may also be used as absorption reservoirs, i.e., as a membrane to take up and simply hold a liquid as in a diaper or an incontinence pad. Absorption reservoirs of this type are also useful in medical applications. For example, a layer or pad of such material may be used in an enzyme immunoassay diagnostic test device where they will draw a bodily fluid through the fine pores of a thin membrane coated, for instance, with monoclonal antibodies that interact with antigens in the bodily fluid which is pulled through the membrane and then held in the absorption reservoir.

As mentioned, according to the preferred embodiments of this invention, the bicomponent fibers are highly attenuated as they exit the bicomponent sheath-core extrusion die using available melt blowing techniques to produce a web or roving wherein the fibers have, on the average, a diameter of about 12 microns or less, down to 5 and even 1 micron. Melt spun fibers of a larger size or even larger melt blown fibers, on the order of, perhaps, 20 microns, are useful in certain applications, for example, in some wicking applications where strength is more important that capillarity; yet, the finer melt blown fibers made possible by the instant inventive concepts have significant advantages in most all of the applications mentioned above. For example, when used in the production of ink reservoirs, these small diameter fibers provide high surface area, and an increased holding capacity as compared to currently available conventional ink reservoirs produced entirely of polyethylene terephthalate. Likewise, the fine fiber size of the melt blown bicomponent continuous filaments of this invention produce tobacco smoke filter elements of enhanced filtration efficiency, providing increased fiber surface area at the same weight of fiber.

Thus, the bicomponent fibers according to this invention containing a polyethylene terephthalate continuous sheath on a polypropylene or other crystalline polymer core, particularly the melt blown bicomponent fibers, have unique and commercially important properties. Contrary to melt blown monocomponent polyester fibers, the melt blown bicomponent fibers of this invention are not brittle and evidence much less shrinkage under heat. The melt blown bicomponent fibers of this invention shrink only about 6% in the amorphous stage and zero after heating to or above 90° C. to crystallize the polyethylene terephthalate. This compares with 40 to 60% shrinkage for conventional melt blown polyethylene terephthalate.

The stiffness of the fibers of this invention is greater than that of conventional melt blown polypropylene; this is reflected in higher and more resilient bulk. Moreover, the stiffness of the bicomponent fibers and bonding of the product permits the use of a less thick wrapping material than currently used in the production of ink reservoirs. Likewise, the solvent resistance of the melt blown bicomponent fibers hereof, having a continuous crystallized polyethylene terephthalate covering, is also much superior to polypropylene fibers when exposed to aromatic, aliphatic and chlorinated solvents.

Webs or rovings formed from the fibers of the invention are thermally bondable with heated fluids such as hot air, saturated steam, or other heating media because of the unusual property of the polyethylene terephthalate sheath to undergo crystallization at a temperature less than the melting temperature of the core material. Thus, the polyethylene terephthalate sheath is still amorphous at up to 90° C. or so in the collected melt blown web or roving. As the web or roving is gathered and shaped in a steam treating or other heating zone, the fibers are bonded at their points of contact and the polyethylene terephthalate is crystallized. The higher melting temperature crystalline core material supports the sheath during the heating step and minimizes shrinkage of the bicomponent fiber as the polyethylene terephthalate is crystallized. Once heated to temperatures above about 90° C., however, the shaped product is relatively self-sustaining and the crystallized polyethylene terephthalate renders the sheath solvent resistant.

The unique method for forming the melt blown bicomponent fibers of the instant invention enables the extrusion, melt blowing and conversion of the resultant fiber web into an elongated, substantially self-sustaining, porous rod which may be subdivided for use, for example, as ink reservoir elements or tobacco smoke filters, in a one-step or continuous process. The porous rod can be continuously overwrapped or covered with a film or coating, if desired, and an air passage can be continuously formed longitudinally along the periphery of the porous rod in an obvious manner. Likewise, if the porous rod is to be used as a cigarette filter, it can be continuously encased in an air permeable or impermeable paper filter wrap, if desired, before the rod is cut into discrete filter rods or filter plugs.

With the foregoing in mind, the primary object of the instant inventive concepts is the production of bicomponent polymeric fibers comprising a continuous sheath of polyethylene terephthalate or a copolymer thereof covering a core of a relatively low cost, low shrinkage, high strength thermoplastic polymeric material such as, preferably, polypropylene or polybutylene terephthalate, and products made therefrom by thermal bonding. As noted, such bicomponent fibers, particularly when melt blown, have a stiffness greater than melt blown monocomponent fibers of a similar diameter, and yet they are not brittle resulting in a fibrous mass with higher and more resilient bulk.

More specifically, the instant invention is directed to methods of making bicomponent fibers having a complete sheath of polyethylene terephthalate or a copolymer thereof on a thermoplastic core wherein, preferably, the fibers, on average, have a diameter of about 12 microns or less, providing high surface area at low fiber weights.

A further important object of this invention is the provision of a substantially self-sustaining three-dimensional porous element formed from a web of flexible thermoplastic fibrous material comprising an interconnecting network of highly dispersed continuous fibers randomly oriented primarily in a longitudinal direction and bonded to each other at points of contact to provide high surface area and very high porosity, preferably over 70%, with at least a major portion, and preferably all of the fibers being bicomponent fibers comprising a continuous sheath of polyethylene terephthalate or a copolymer thereof, and with the element being dimensionally stable at temperatures up to about 100° C. and resistant to common organic ink solvents such as alcohols, ketones and xylene up to at least about 60° C. Obviously, the products of this invention can be of various sizes and shapes. In many instances, such as, for example, when used as an ink reservoir or a cigarette filter, such elements will be generally elongated and substantially cylindrical. Yet, when used, for example, for other applications, the three-dimensional elements may be shaped, as by grinding or in any other conventional manner, depending upon their particular application. Thus, while the term "elongated porous rod" is used herein to describe many of these elements, it should be understood that this term is not intended to be limited to a cylindrical shape except where such a configuration would be appropriate.

Yet another object of this invention is the provision of a method for making such substantially self-sustaining elongated elements combining bicomponent extrusion technology with melt blown attenuation to produce a web or roving of highly entangled fine fibers with a sheath of substantially amorphous polyethylene terephthalate or a copolymer thereof which is bondable at a lower temperature than the melting point of the core material, and then gathering the web or roving and heating the same by a heated fluid, preferably saturated steam, or in a dielectric oven, to bond the fibers at their points of contact and crystallize the polyethylene terephthalate at the same time.

A still further object of the instant inventive concepts is the provision of products incorporating porous elements formed from the bicomponent fibers of the instant invention useful commercially as 1) wick reservoirs, including ink reservoirs and marking and writing instruments incorporating the same; 2) filtering materials, including tobacco smoke filters and filtered cigarettes formed therefrom; 3) wicks for transporting liquid from one place to another by capillary action, including fibrous nibs for marking and writing instruments and capillary wicks in medical applications designed to transport a bodily fluid to a test site in a diagnostic device; and 4) absorption reservoirs, including membranes for taking up and holding a liquid as in a diaper or an incontinence pad, or in medical applications such as enzyme immunoassay diagnostic test devices wherein a pad of such material will draw a bodily fluid through a thin membrane and hold the fluid pulled therethrough.

While the foregoing applications are all commercially important, a primary object of this invention is the provision of a high capacity ink reservoir for a marking or writing instrument defined by an elongated porous rod formed of a network of fine bicomponent fibers having a continuous sheath of polyethylene terephthalate or a copolymer thereof which is compatible with all currently available ink formulations and which provides an adequate release pressure to minimize "leakers" even when used in a roller ball pen or the like.

Upon further study of the specification and the appended claims, additional objects and advantages of this invention will become apparent to those skilled in the art.

BRIEF DESCRIPTION OF THE DRAWINGS

A better understanding of the present invention, as well as other objects, features and advantages thereof, will become apparent upon consideration of the detailed description herein, in connection with the accompanying drawings wherein like reference characters refer to like parts.

DETAILED DESCRIPTION OF THE INVENTION

Figure 1:
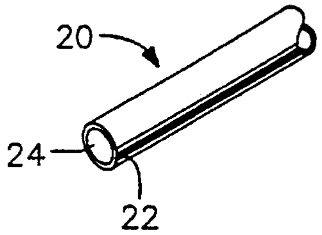
FIG. 1 is an enlarged perspective view of one form of a "sheath-core" bicomponent fiber according to the instant invention.

The instant inventive concepts are embodied in a bicomponent, sheath-core, preferably melt blown, fiber where the core is a low cost, low shrinkage, high strength, thermoplastic polymer, preferably polypropylene or polybutylene terephthalate, and the sheath is polyethylene terephthalate or a copolymer thereof.

The method of manufacturing the specific polymers used in the production of the bicomponent fibers is not part of the instant invention. Processes for making these polymers are well known in the art and, as noted above, most commercially available polyethylene terephthalate materials or copolymers thereof can be used. While it is not necessary to utilize sheath and core materials having the same melt viscosity, as each polymer is prepared separately in the bicomponent melt blown fiber process, it may be desirable to select a core material, e.g. polypropylene or polybutylene terephthalate, of a melt index similar to the melt index of the sheath polymer, or, if necessary, to modify the viscosity of the sheath polymer to be similar to that of the core material to insure compatibility in the melt extrusion process through the bicomponent die. Providing sheath-core components with compatible melt indices is not a significant problem to those skilled in this art with commercially available thermoplastic polymers and additives.

Additionally, while reference is made, for example, to a sheath formed of polyethylene terephthalate or a copolymer thereof, additives may be incorporated or compounded into the polymer prior to extrusion to provide the fibers and products produced therefrom with unique properties, e.g., increased hydrophilicity or even increased hydrophobicity.

While polypropylene and polybutylene terephthalate are the preferred core materials for the reasons iterated below, other highly crystalline thermoplastic polymers such as high density polyethylene, as well as polyamides such as nylon 6 and nylon 66, can be used. The main requirement of the core material is that it is crystallized when extruded or crystallizable during the melt blowing process. Polyethylene terephthalate, in contrast, normally requires a separate drawing stage for crystallization.

Polypropylene is a preferred core-forming material due to its low price and ease of processability. Polypropylene has also been found to be particularly useful in providing the core strength needed for production of fine fibers using melt blown techniques. Various modified polypropylenes can be used as the core-forming material to achieve even better adhesion to the sheath such as DuPont's BYNEL CXA Series 5000 anhydride-modified polypropylenes, other acid anhydride (preferably maleic acid anhydride) polypropylenes, anhydride functionalized polypropylenes, adhesive polypropylenes such as Quantum Chemical Corporation's PLEXAR extrudable adhesive polypropylenes, or other reactive polypropylenes.

Unlike polyethylene terephthalate, polybutylene terephthalate crystallizes easily and is not amorphous for any appreciable length of time. Thus, it is ineffective as a sheath-forming material according to this invention in that the resultant bicomponent fiber is not bondable. A polyethylene terephthalate sheath/polybutylene terephthalate core bicomponent fiber has the advantage, however, of an especially effective bond between the sheath and core due to the similar properties in these related polyester polymers, and is stable to temperatures approaching 250° C., in contrast to the degradation of product at substantially lower temperatures using a polypropylene core bicomponent fiber.

Reference is now made generally to the drawings, and more particularly, to FIG. 1, wherein a bicomponent fiber according to the preferred embodiments of the instant inventive concepts is schematically shown at 20. Of course, the size of the fiber and the relative proportion of the sheath-core portions thereof have been greatly exaggerated for illustrative clarity. The fiber 20 is preferably comprised of a polyethylene terephthalate or polyethylene terephthalate copolymer sheath 22 and a polypropylene or polybutylene terephthalate core 24. The core material comprises at least about 30%, and up to about 90% by weight of the overall fiber content.

It is well known that capillary pressure and absorbency of porous media increases in approximately direct proportion to the wettable fiber surface. One way to increase the fiber surface is to modify the fiber cross-section to product trilobular or Y-shaped fibers or other multi-branched cross-sections such as "X"- or "H"-shapes. Process imperatives heretofore have produced non-round fibers which are relatively large resulting in an absorbing medium of high surface area, but with a relatively low number of fibers placed far from each other. Such media has large pores, and while retaining a liquid at the fiber surface, the liquid is poorly held in the center of the pores. This is particularly disadvantageous in the production of an ink reservoir for writing and marking instruments which requires controlled release of sufficient ink to the writing point or nib, while retaining the ink sufficiently to avoid leakage under shock, as in the conventional drop test, or in the presence of rising temperatures, as in the conventional transport and oven test.

With a constant fiber bulk density or weight, the surface increases with diminishing fiber diameter. Absorbing media made of numerous small fibers has a more uniform retention and can be better tailored for optimum performance. The bicomponent melt blown process utilized according to the instant inventive concepts provides fine fibers with increased surface area having improved capillary pressure and absorbency over ordinary fibers, even those with non-round cross-sections. The rate of flow of a liquid can be controlled through density changes only, when the smallest commercial fibers are used. With the melt blown techniques of this invention, the flow can be controlled by simply changing the size of the fiber.

Figure 2:
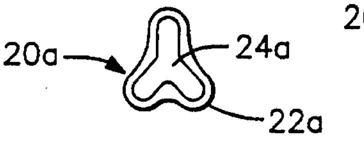
FIG. 2 is an enlarged end elevation view of a trilobal or "Y" shaped bicomponent fiber according to this invention.
Figure 3:
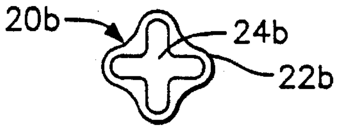
FIG. 3 is a similar view of an "X" or cross-shaped embodiment of the bicomponent fiber of this invention.

If desired, however, even fine bicomponent fibers of non-round cross-section can be produced according to this invention for particular applications. Thus, by selecting openings in the sheath-core extrusion die of an appropriate shape, melt blown bicomponent fibers with a non-round cross section having even further increased surface area can be produced which may be advantageous, for example, if the product is to be used as a filter. Moreover, the non-round fiber cross-section enhances the use of air when the fiber is attenuated by melt blowing techniques. A trilobal or "Y" shaped fiber 20*a* is shown in FIG. 2 comprising a sheath 22*a* and a core 24*a*. Similarly, a cross or "X" shaped bicomponent fiber as seen at 20*b* in FIG. 3, comprising a sheath 22*b* and a core 24*b*, is illustrative of many multi-legged fiber core sections possible. It will be seen that, in each instance, the sheath of polyethylene terephthalate completely covers the core material. Failure to enclose any major portion of the core material minimizes or obviates many of the advantages of the instant invention discussed herein.

FIGS. 13 through 17 schematically illustrate preferred equipment used in making a bicomponent fiber according to the instant inventive concepts, and processing the same into continuous, three-dimensional, porous elements, that can be subsequently subdivided to form, for example, ink reservoir elements to be incorporated into marking or writing instruments, or tobacco smoke filter elements to be incorporated into filtered cigarettes or the like. The overall processing line is designated generally by the reference numeral 30 in FIG. 13. In the embodiment shown, the bicomponent fibers themselves are made in-line with the equipment utilized to process the fibers into the porous elements. Such an arrangement is practical with the melt blown techniques of this invention because of the small footprint of the equipment required for this procedure. While the in-line processing has obvious commercial advantages, it is to be understood that, in their broadest sense, the instant inventive concepts are not so limited, and bicomponent fibers and webs or rovings formed from such fibers according to this invention may be separately made and processed into diverse products in separate or sequential operations.

Whether in-line or separate, the fibers themselves can be made using standard fiber spinning techniques for forming sheath-core bicomponent filaments as seen, for example, in Powell U.S. Pat. Nos. 3,176,345 or 3,192,562 or Hills U.S. Pat. No. 4,406,850 (the '345, '562 and '850 patents, respectively, the subject matters of which are incorporated herein in their entirety by reference). Likewise, methods and apparatus for melt blowing of fibrous materials, whether they are bicomponent or not, are well known. For example, reference is made to the aforementioned '245, '995 and '759 patents as well as Schwarz U.S. Pat. Nos. 4,380,570 and 4,731,215, and Lohkamp et al, U.S. Pat. No. 3,825,379, (the '570, '215 and '379 patents, respectively, the subject matters of which are incorporated herein in their entirety by reference). The foregoing references are to be considered to be illustrative of well known techniques and apparatus for forming of bicomponent fibers and melt blowing for attenuation that may be used according to the instant inventive concepts, and are not to be interpreted as limiting thereon.

Figure 14:
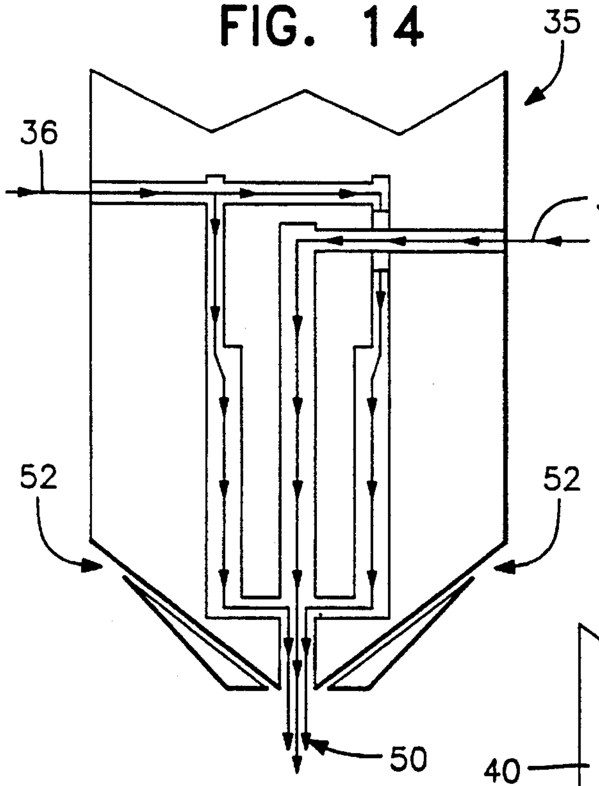
FIG. 14 is an enlarged schematic view of the sheath-core melt blown die portion of the process line of FIG. 13.
Figure 15:
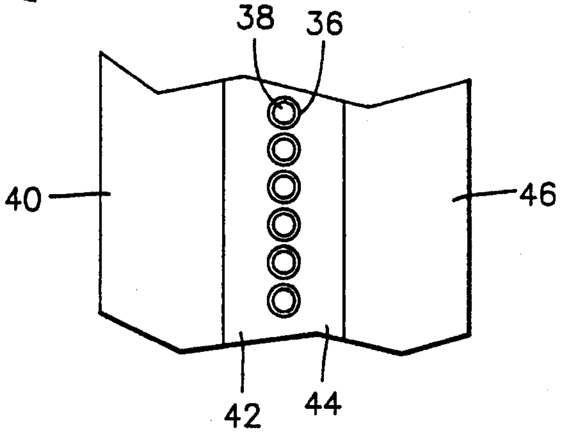
FIG. 15 is an enlarged schematic view of a split die element for forming bicomponent fibers according to the instant invention.
Figure 16:
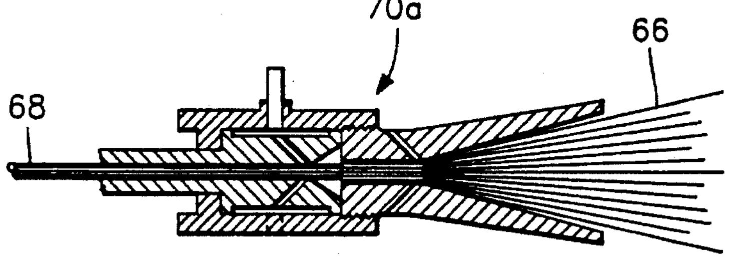
FIG. 16 is a schematic cross-sectional view of a steam-treating apparatus which can be used for bonding and forming a continuous porous rod according to the instant invention.
Figure 17:
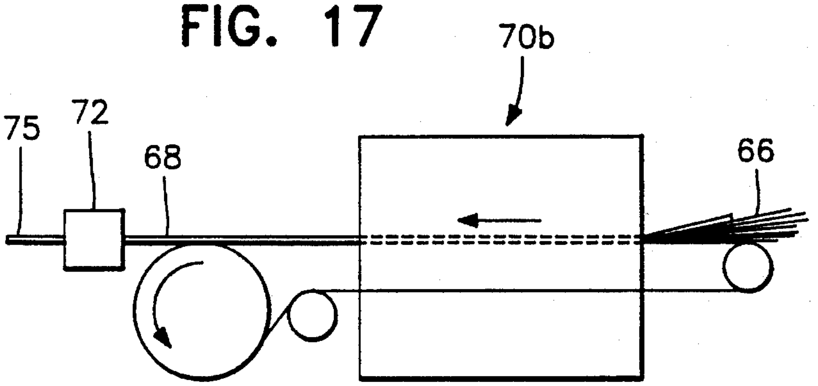
FIG. 17 is a schematic view of an alternate heating means in the nature of a dielectric oven for bonding and forming the continuous porous rod of this invention.

In any event, one form of a sheath-core melt blown die is schematically shown enlarged in FIGS. 14 and 15 at 35. Molten sheath-forming polymer 36, and molten core-forming polymer 38 are fed into the die 35 and extruded therefrom through a pack of four split polymer distribution plates shown schematically at 40, 42, 44 and 46 in FIG. 15 which may be of the type discussed in the aforementioned '850 patent.

Using melt blown techniques and equipment as illustrated in the '759 patent, the molten bicomponent sheath-core fibers 50 are extruded into a high velocity air stream shown schematically at 52, which attenuates the fibers 50, enabling the production of fine bicomponent fibers on the order of 12 microns or less. Preferably, a water spray shown schematically at 54, is directed transversely to the direction of extrusion and attenuation of the melt blown bicomponent fibers 50. The water spray cools the fibers 50 to enhance entanglement of the fibers while minimizing bonding of the fibers to each other at this point in the processing, thereby retaining the fluffy character of the fibrous mass and increasing productivity.

If desired, a reactive finish may be incorporated into the water spray to make the polyethylene terephthalate fiber surface more hydrophilic or "wettable". Even a lubricant or surfactant can be added to the fibrous web in this manner, although unlike spun fibers which require a lubricant to minimize friction and static in subsequent drawing operations, melt blown fibers generally do not need such surface treatments. The ability to avoid such additives is particularly important, for example, in medical diagnostic devices where these extraneous materials may interfere or react with the materials being tested.

On the other hand, even for certain medical applications, treatment of the fibers or the three-dimensional elements, either as they are formed or subsequently, may be necessary or desirable. Thus, while the resultant product may be a porous element which readily passes a gas such as air, it is possible by surface treatment or the use of a properly compounded sheath-forming polymer, to render the fibers hydrophobic so that, in the absence of extremely high pressures, it may function to preclude the passage of a selected liquid. Such a property is particularly desirable when a porous element according to the instant invention is used, for example, as a vent filter in a pipette tip or in an intravenous solution injection system. The materials to so-treat the fiber are well known and the application of such materials to the fiber or porous element as they are formed is well within the skill of the art.

Additionally, a stream of a particulate material such as granular activated charcoal or the like (not shown) may be blown into the fibrous mass as it emanates from the die, producing excellent uniformity as a result of the turbulence caused by the high pressure air used in the melt blowing technique. Likewise, a liquid additive such as a flavorant or the like may be sprayed onto the fibrous mass in the same manner.

Figure 13:
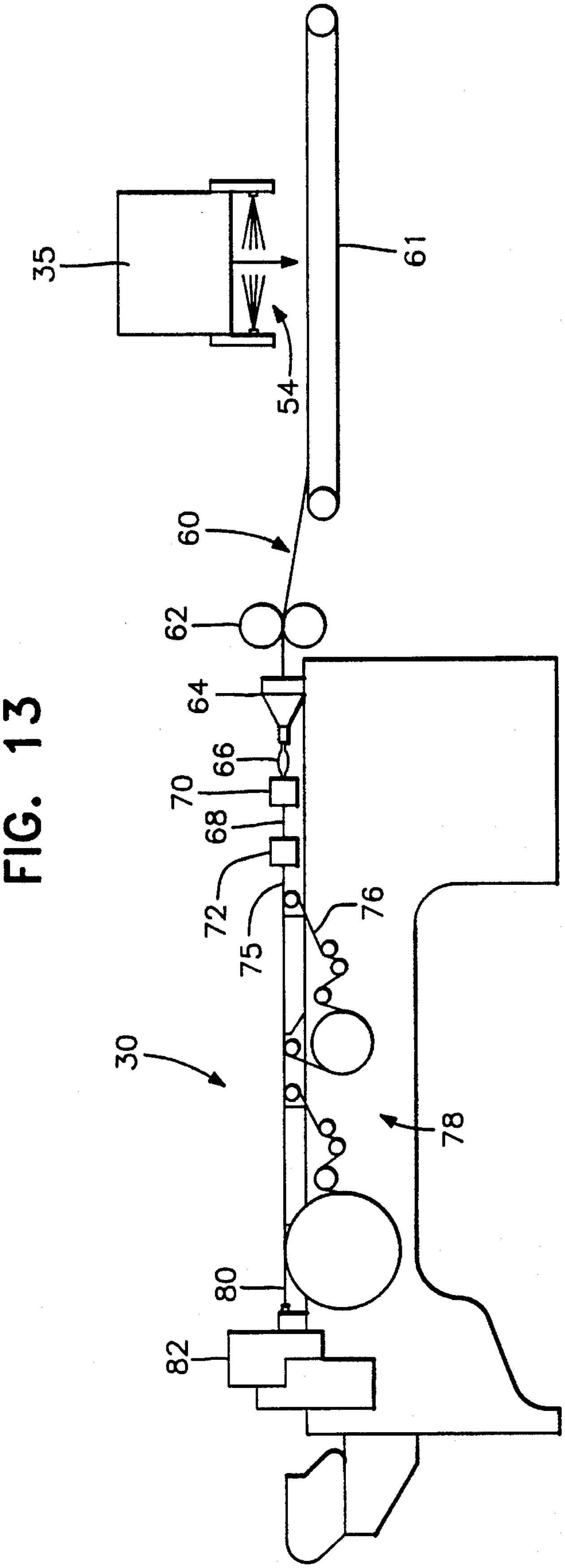
FIG. 13 is a schematic view of one form of a process line for producing porous rods from the bicomponent fibers of this invention.

The melt blown fibrous mass is continuously collected as a randomly dispersed entangled web or roving 60 on a conveyor belt shown schematically at 61 in FIG. 13 (or a conventional screen covered vacuum collection drum as seen in the '759 patent, not shown herein) which separates the fibrous web from entrained air to facilitate further processing. This web or roving 60 of melt blown bicomponent fibers is in a form suitable for immediate processing without subsequent attenuation or crimp-inducing processing.

The polyethylene terephthalate sheath material at this point in the processing is still amorphous. In contrast, the core material, whether it be polypropylene, polybutylene terephthalate or other appropriate polymers, is crystalline, providing strength to the bicomponent fibers and precluding significant shrinkage of these materials.

The remainder of the processing line seen in FIG. 13 may use apparatus known in the production of plasticized cellulose acetate tobacco smoke filter elements, although minor modifications may be required to individual elements thereof in order to facilitate heat bonding of the fibers. Exemplary apparatus will be seen, for example, in Berger U.S. Pat. Nos. 4,869,275, 4,355,995, 3,637,447 and 3,095,343 (the '275, '995, '447 and '343 patents, the subject matters of which are incorporated herein in their entirety by reference). The web or roving of melt blown sheath-core bicomponent fibers 60 is not bonded or very lightly bonded at this point and is pulled by nip rolls 62 into a stuffer jet 64 where it is bloomed as seen at 66 and gathered into a rod shape 68 in a heating means 70 which may comprise a heated air or steam die as shown at 70*a* in FIG. 16 (of the type disclosed in the '343 patent), or a dielectric oven as shown at 70*b* in FIG. 17. The heating means raises the temperature of the gathered web or roving above about 90° C. to cure the rod, first softening the sheath material to bond the fibers to each other at their points of contact, and then crystallizing the polyethylene terephthalate sheath material. The element 68 is then cooled by air or the like in the die 72 to produce a stable and relatively self-sustaining, highly porous fiber rod 75.

For ink reservoirs, the bonding of the fibers need only provide sufficient strength to form the rod and maintain the pore structure. Optionally, depending upon its ultimate use, the porous rod 75 can be coated with a plastic material in a conventional manner (not shown) or wrapped with a plastic film or a paper overwrap 76 as schematically shown at 78 to produce a wrapped porous rod 80. The continuously produced porous fiber rod 80, whether wrapped or not, may be passed through a standard cutter head 82 at which point it is cut into preselected lengths and deposited into an automatic packaging machine.

Figure 4:
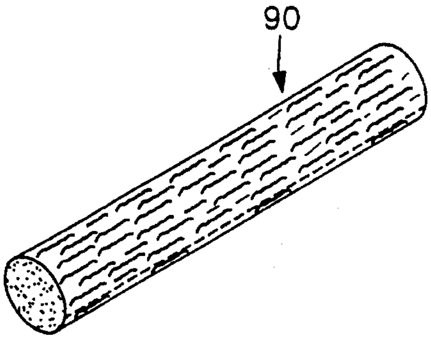
FIG. 4 is an enlarged perspective view of a substantially self-sustaining elongated element formed from a web of the bicomponent fibers of the instant invention.

By subdividing the continuous porous rod in any well known manner, a multiplicity of discrete porous elements are formed, one of which is illustrated schematically in FIG. 4 at 90. Each element 90 comprises an elongated air-permeable body of fine melt blown bicomponent fibers such as shown at 20 in FIG. 1, bonded at their contact points to define a high surface area, highly porous, self-sustaining element having excellent capillary properties when used as a reservoir or wick and providing a tortuous interstitial path for passage of a gas or liquid when used as a filter.

Figure 6:
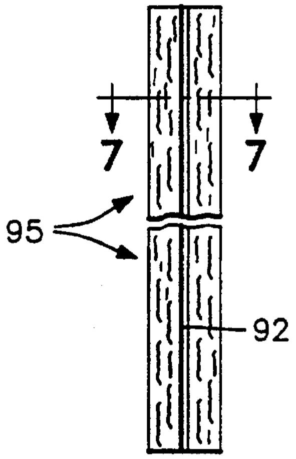
FIG. 6 is a side elevational view of an ink reservoir element according to this invention, including a longitudinally continuous peripheral air passageway integrally formed therein.
Figure 7:
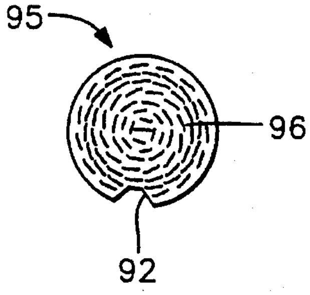
FIG. 7 is an enlarged transverse cross-sectional view along lines 7—7 of FIG. 6.
Figure 5:
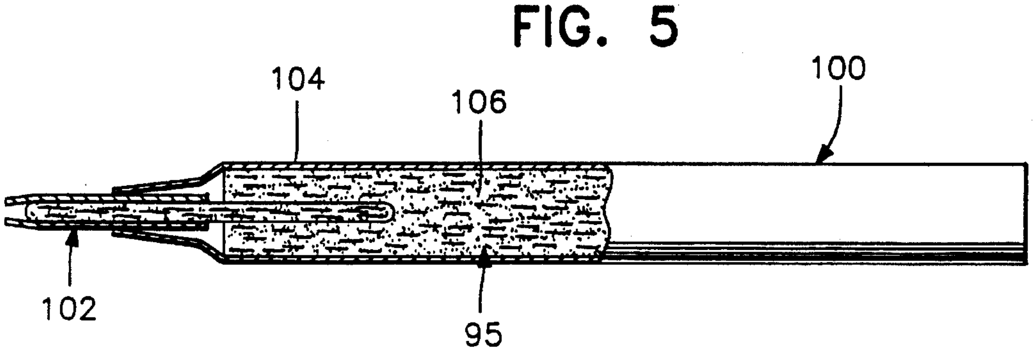
FIG. 5 is a cross-sectional view, partially broken away, of one form of a writing instrument in the nature of a roller ball disposable pen incorporating an ink reservoir, and possibly a roller ball wick made according to the instant inventive concepts.

It is to be understood that elements 90 produced in accordance with this invention need not be of uniform construction throughout as illustrated in FIG. 4. For example, a continuous longitudinally extending peripheral groove such as seen at 92 in FIGS. 6 and 7 can be provided as an air passage in an ink reservoir 95 (which may or may not include a coating or film wrap 96) if necessary for use in, for example, a writing instrument as shown generally at 100 in FIG. 5. The writing instrument 100 may include a roller ball wick 102 which can also be produced by the techniques of this invention which engages a roller ball writing tip 103 in a conventional manner. The ink reservoir 95 is contained within a barrel 104 in fluid communication with the roller ball wick 102 to controllably release a quantity of ink 106 to the roller ball 103 in the usual way.

As is well known in the art, the roller ball wick 102 will generally have a higher capillarity than the reservoir 95, with the fibers thereof being more longitudinally oriented so as to draw the ink 106 from the reservoir 95 and feed the same to the roller ball 103. It is well within the skill of the art to form the three-dimensional porous elements of the instant invention with higher or lower capillarity depending upon the particular application by controlling, for example, the speed with which the fibrous mass is fed into the forming devices, the size and shape of the forming devices and other such obvious processing parameters.

Figure 8:
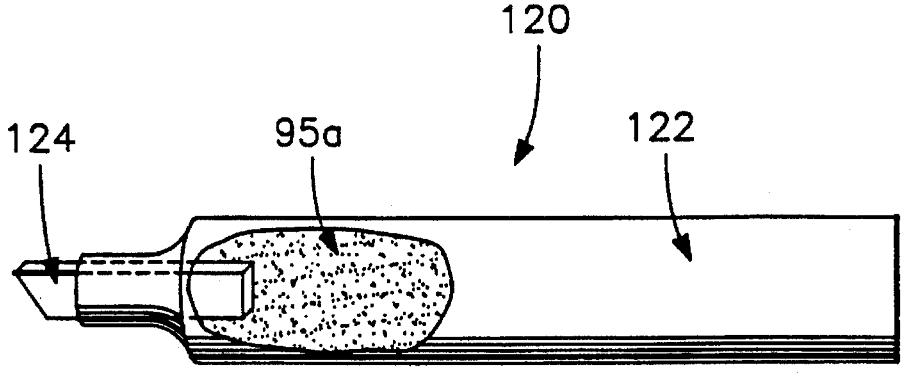
FIG. 8 is a side elevational view, partially broken away, of a marking instrument in the nature of what is commonly called a "felt tip" marker also incorporating an ink reservoir and, in this instance, a fibrous nib, made according to the instant inventive concepts.

In FIG. 8, a marking device is shown generally at 120, as including a conventional barrel 122, containing an ink reservoir 95*a* in fluid communication with a fibrous wick or nib 124, which may be of the type commonly referred to as a "felt tip". The fibrous wick or nib 124 may be provided with the shape shown in FIG. 8, or any other desired shape, by conventional grinding techniques well known to those skilled in this art. Again, the nib 124 is generally denser, with the fibers generally more longitudinally oriented, than the fibers from which the reservoir 95*a* are made, in order to provide the nib with the higher capillarity necessary to draw the ink from the reservoir in use.

Figure 9:
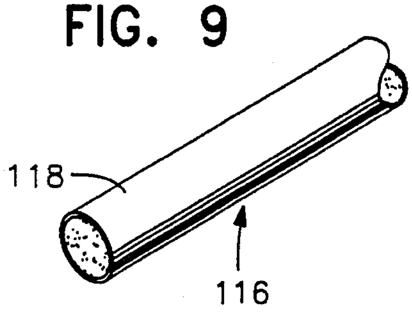
FIG. 9 is a perspective view of an overwrapped tobacco smoke filter rod produced from bicomponent fibers according to the instant invention concepts.
Figure 10:
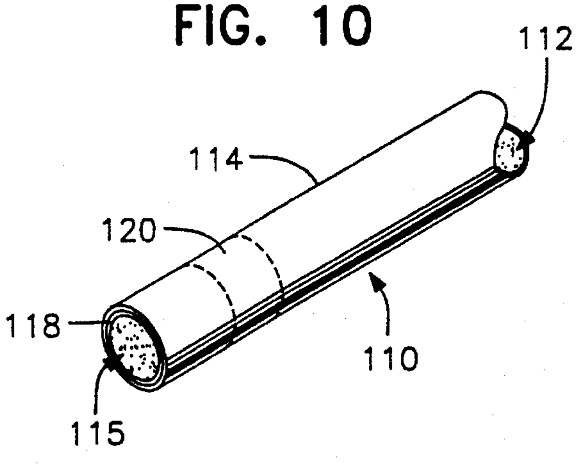
FIG. 10 is an enlarged perspective view of a cigarette including a filter element according to this invention.

Elements 90 can also be provided with interior pockets, exterior grooves, crimped portions or other modifications (not shown) as in the aforementioned prior patents to Berger, or others, particularly if they are to be used as tobacco smoke filters. A conventional filtered cigarette is illustrated at 110 in FIG. 10 as comprising a tobacco rod 112 covered by a conventional cigarette paper 114 and secured to a filter means comprising a discrete filter element 115, such as would result from further subdividing a filter rod 116 shown in FIG. 9. The filter element 115 may be overwrapped with an air permeable or air impermeable plugwrap 118 and secured to the tobacco rod 112 in a conventional manner as by standard tipping wrap 119.

Figure 11:
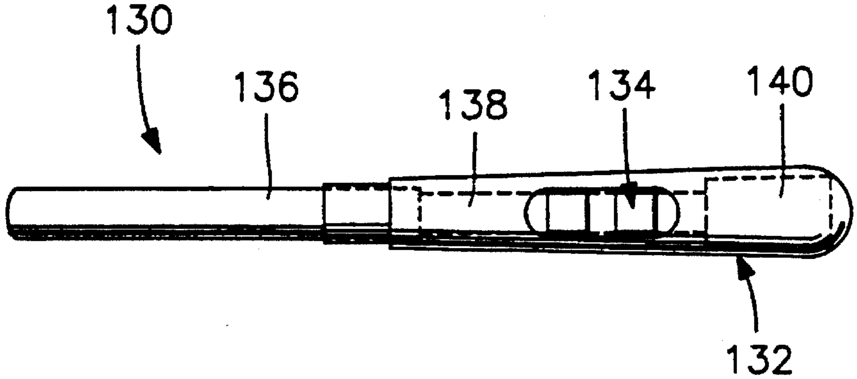
FIG. 11 is a schematic elevational view of a diagnostic test device incorporating a lateral flow wick according to the instant invention designed to transport a bodily fluid to a test site.
Figure 12:
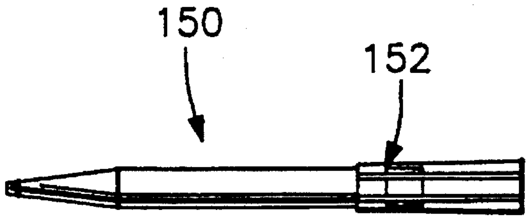
FIG. 12 is a schematic elevational view of a pipette tip or an intravenous solution injection system incorporating a pad of material according to the instant inventive concepts designed as an in-line filter for in vitro or in vivo treatment of a liquid sample.

To illustrate various other uses for three-dimensional porous elements made according to the instant inventive concepts, reference is made to FIGS. 11 and 12. In FIG. 11, a diagnostic test device is shown generally by reference numeral 130 as comprising a shell or housing 132 encasing a test site 134 which may be, for example, a porous membrane or the like, with an exposed wick element 136 which may be made according to this invention, an internal wick 138 of a higher capillarity, also made by the instant inventive concepts, and an absorptive reservoir 140, also a product of this invention. A device of this type is capable, for example, of collecting a bodily fluid with the exposed wick 136, carrying the same via the internal wick 138 to and through the test site 134, and then absorbing and holding the liquid in the reservoir 140. Thus, this device utilizes porous elements according to this invention as a lateral flow wick designed to transport a liquid to a test site, and then also provides a reservoir to draw the liquid past the test site and then to hold the liquid.

FIG. 12 is a schematic showing of the use of a plug 152 of filtering material according to this invention, as a vent filter in a pipette designated generally by the reference numeral 150 (or as an in-line filter in, for example, an intravenous solution injection system). The pad or plug of material 152 formed according to this invention may have been pre-treated to render the fibers or the element in general hydrophobic so that air may pass, but liquids will not. In-line filters are well known and are commonly used in vitro to remove undesirable materials from a sample prior to a diagnostic test, or in vivo, for example, in flushing the kidneys prior to kidney dialysis, or to filter out blood clots in open heart surgery.

Pads of material made according to this invention can also be used as capillaries to absorb excess ink in a printing device, for example, as an "overshot pad" in an ink jet printer. Likewise, such materials can be used as an absorptive device for the removal of saliva and other bodily fluids from the oral cavity.

The foregoing illustrative applications of three-dimensional porous elements made according to the instant invention are not to be considered as limiting, but are indicative of the many uses of such materials which will be recognized by those skilled in this art. Because of the bonded nature of such porous elements, they can be provided in any shape, either by direct formation or by subsequent grinding or molding to any desired configuration.

The following examples provide further information regarding the instant inventive concepts and illustrate some of the advantages of the products of this invention particularly when utilized as an ink reservoir for a marking or writing instrument. It is to be understood, however, that these examples are illustrative and the various materials and processing parameters may be varied within the skill of the art without departing from the instant inventive concepts.

Dry polyethylene terephthalate with an intrinsic viscosity of 0.57 (measured in 60/40 phenol/tetrachlorethane) was extruded at about 290° C. Simultaneously, polypropylene of a melt flow of 400 g/10 min was extruded from a second extruder into a common die head. In the die head, the two polymers were separately distributed by multiple channels into a triangular section "nose cone". The polymers exited at the tip of the nose cone through spinneret type capillaries, each molten filament having an amorphous polyethylene terephthalate sheath on a crystalline polypropylene core at approximately a 50/50 weight ratio. The filaments were attenuated (drawn) by high velocity air, flowing at both sides of the nose cone in a manner typical of melt blown processes.

The resulting melt blown webs were shaped into cylindrical rods by pulling them through dies where the fibers were exposed to live steam. The steam heating not only shaped and bonded the web, but also crystallized the fibers.

The crystallized fibers were dimensionally stable to subsequent heating and did not swell when submerged in ink carrier solvents, such as low alcohols, ketones and xylene and formic acid-containing inks.

Table 1, compares various properties of cylindrical ink reservoirs formed from the novel melt blown bicomponent fibers of this invention with the more conventional monocomponent polyethylene terephthalate fiber reservoirs of the prior art.

porous rod. Labor costs, inventory costs and time savings are evident.

A similar comparison is shown in Table 2.

TABLE 2

| Sample | Fiber | Fiber Dia. (microns) | Fiber Wt. (gm) | Porosity % | Ink Abs. (gm) | Relative Hardness |
|---|---|---|---|---|---|---|
| Prior Art | PET | 18 | 2.10 | 89.0 | 5.39 | 80.9 |
| Sample 1 | PET/PP | 9 | 1.50 | 89.6 | 5.39 | 95.8 |
| Sample 2 | PET/PP | 6 | 1.28 | 88.9 | 5.45 | 88.4 |
| Sample 3 | PET/PP | 3 | 1.20 | 91.7 | 5.83 | 86.2 |

[PET = Polyethylene Terephthalate; PP = Polypropylene]

The melt blown bicomponent fibers in Samples 1–3 contain approximately 40% polyethylene terephthalate by weight. Again, the ghigher absorption of the bicomponent fibers of this invention is seen when compared to the same quantity of conventional polyethylene terephthalate crimp yarn. Table 2 also illustrates the advantage of with increasingly small fibers, which can only be provided with the melt blowing process of this invention.

While preferred embodiments and processing parameters have been shown and described, it is to be understood that these examples are illustrative and can be varied within the skill of the art without departing from the instant inventive concepts.

What is claimed is:

1. A method of making a substantially self-sustaining elongated porous element comprising:

a) providing separate sources of a molten core-forming thermoplastic material and a molten sheath-forming material selected from the group consisting of amor-

| Sample | Fiber | Res. Dia. (mm) | Fiber Dia. (microns) | Fiber Wt. (gm) | Porosity % | Ink Abs. (gm) | Relative Hardness |
|---|---|---|---|---|---|---|---|
| Prior Art | PET | 25.0 | 18 | 7.99 | 86.9 | 24.7 | 85.1 |
| Invention | PET/PP | 25.1 | 9 | 4.80 | 90.9 | 25.1 | 90.0 |

[PET = Polyethylene Terephthalate; PP = Polypropylene]

The novel polyethylene terephthalate/polypropylene fibers show a substantially equal liquid absorption using about 40% less fiber weight. Raw material costs are reduced not only because of lower overall polymer weights, but also because of the lower cost of polypropylene as compared with polyethylene terephthalate, particularly on a volume basis (the specific gravity of polyethylene terephthalate is 1.38 g/cm$^3$, while that of polypropylene is only 0.90 g/cm$^3$). The market price of polyethylene terephthalate per cubic inch, listed in the November 1995 issue of *Plastics Technology*, is 3.6 cents for railcar quantities while the comparable price for polypropylene is only 1.3 cents.

Additional cost savings are realized because of the manufacturing efficiencies of the method of this invention. For example, the production of conventional polyester ink reservoirs requires the melt spinning of polyethylene terephthalate yarn, followed by a separate drawing and crimping step, and finally a further separate operation to wrap the tow with plastic film. The bicomponent melt blowing process of this invention effects all of the processing in a single step, since the fiber formation and reservoir shaping is done in-line, while the drawing and crimping is not necessary. Even wrapping can be minimized or avoided in many instances due to the relatively self-sustaining nature of the phous polyethylene terephthalate and copolymers thereof;

b) continuously extruding said molten core-forming and sheath-forming materials through a multiplicity of openings in a conjugate sheath-core die to provide a multiplicity of bicomponent fibers, each fiber comprising a continuous core of core-forming material substantially totally surrounded by a sheath of sheath-forming material wherein the sheath forming material has a higher melting temperature than the core forming material;

c) collecting said bicomponent fibers on a continuously moving surface to form a highly entangled web of said bicomponent fibers in the form of an interconnecting network of highly dispersed continuous fibers randomly oriented primarily in the direction of movement of said moving surface;

d) gathering said web of bicomponent fibers;

e) heating said gathered web to bond said fibers to each other at their points of contact and crystallize said polyethylene terephthalate;

f) cooling said gathered web to form a three-dimensional continuous porous element comprising intercommunicating interstitial spaces; and g) cutting said continuous porous element into discrete lengths.

2. A method according to claim 1, wherein said multiplicity of bicomponent fibers is contacted with a gas under pressure as they exit the sheath-core die to attenuate said bicomponent fibers while they are still in their molten state.

3. The method of claim 2, wherein the bicomponent fibers are formed and processed into said porous element in a continuous, in-line, manner.

4. The method of claim 2, wherein said sheath-forming material is polyethylene terephthalate.

5. The method of claim 2, wherein said core-forming material is polypropylene.

6. The method of claim 2, wherein said core-forming material is polybutylene terephthalate.

7. The method of claim 2, wherein said fibers are attenuated sufficiently to produce a web or roving of fibers having an average diameter of about 12 microns or less.

8. The method of claim 2, wherein said openings of said sheath-core die through which said bicomponent fibers are extruded are non-circular, thereby producing bicomponent fibers of a non-round cross-section.

9. The method of claim 8, wherein said fibers have a "Y" shaped cross-section.

10. The method of claim 8, wherein said fibers have an "X" shaped cross-section.

11. The method of claim 2, further including incorporating an additive into said web or roving as said bicomponent fibers exit the sheath-core die.

12. The method of claim 11, wherein said additive is activated charcoal.

13. The method of claim 11, wherein said additive is a flavorant.

14. The method of claim 2, further including the step of continuously forming a longitudinal recess in said porous element along the periphery thereof.

15. The method of claim 2, further including the step of continuously covering said porous element with an outer sheath prior to cutting the same into discrete lengths.

16. The method of claim 15, wherein said porous element is continuously overwrapped with a strip material to form said outer sheath.

17. The method of claim 2, further including the step of wrapping said porous rod with a filter tipping material prior to cutting the same into discrete lengths.

* * * * *